Dec. 14, 1971   A. F. KIRCHGESSNER   3,626,643
TOOL GRINDING ATTACHMENT

Filed Dec. 15, 1969   2 Sheets-Sheet 1

INVENTOR.
ALBERT F. KIRCHGESSNER
BY
Drummond, Cahill & Phillips
ATTORNEYS

Dec. 14, 1971  A. F. KIRCHGESSNER  3,626,643
TOOL GRINDING ATTACHMENT
Filed Dec. 15, 1969  2 Sheets-Sheet 2

INVENTOR.
ALBERT F. KIRCHGESSNER
BY
Drummond, Cahill & Phillips
ATTORNEYS

3,626,643
TOOL GRINDING ATTACHMENT
Albert F. Kirchgessner, 2306 Betty Elyse Lane,
Phoenix, Ariz. 85022
Filed Dec. 15, 1969, Ser. No. 885,212
Int. Cl. B24b *19/00*
U.S. Cl. 51—218                    2 Claims

ABSTRACT OF THE DISCLOSURE

A grinding attachment for cutting tools used in a standard metal-turning machine. The device includes a shank adapted to fit a collet in a standard tool and cutter machine. A shoulder is integrally formed with the shank and the shoulder has means for positioning a rectangular shaped tool within the aperture in the shoulder and holding the tool in place to a very close tolerance. Because of the unique attitude of the tool in respect to the position of the grinder, the shape of the tool follows the arc of the circle from nose to heel. This makes it possible to renew the cutting edge of the tool by shaving the face along the rake angle, thus extending the life of a tool by as much as 500 percent.

---

Tool and die making is a highly skilled occupation. Likewise, skilled tool and die makers and machinists are often in short supply and always in great demand. Consequently, the product of their labor is an item of considerable expense to manufacturers. One element of expense connected with tools used in machine shops is the down time of a machine when the tool currently in use must be returned for regrinding or replacement. In the special area of turning operations in a machine shop, the most widely used type of tool is a rectangular shank flat form tool having a tool tip at one end, the other end being adapted to fit a tool holder. It is the tool of choice when used as a plunge tool, i.e., the tool being moved straight into the surface of the work until the surface of the work assumes the shape of the tool.

One of the serious problems in grinding such tools is the development of excessive heat attended by risk of burning the tool. Also, the standard type of flat form tool has a very short life. It is capable of being sharpened on a few times.

When the cutting edge of such a tool dulls, it must be taken out of the machine and reground. This means that the down time of a turning machine is undesirably increased. This results in frequent down time and delays the progress of the work with resulting expense and inconvenience to all concerned. In order to save the time of tool and die makers and machinists and to speed production in the shop, it has long been desired to have a tool which embodies the convenience and utility of the flat form tool and which could be used for longer periods of time without replacement.

Circle form tools have been known for decades and they have overcome many of the disadvantages found in prior art flat form tools. They can be sharpened many times and have a much longer life. But, circle form tools require expensive machinery to use them. The problem is to invent a tool with the combined advantages of the flat form and circle form tools.

An object of this invention is to provide a device which will save time in grinding a tool and which will develop substantially less heat thereby reducing the risk of burning the tool.

Another object of this invention is to provide such a device which will finish a tool in a manner superior to that obtainable by devices and methods of the prior art.

In yet another aspect, it is an object of this invention to provide such a device which is of simple construction, rugged and durable.

Another object of this invention is to provide such a device which is convenient to use.

Other, further, and more specific objects and advantages of the invention disclosed will become apparent to those skilled in the art from the following description of the invention taken in conjunction with the drawings in which.

Briefly, I provide a flat form tool for use on a standard metal-turning machine. In this tool I provide a shank having a rectangular cross section. I also provide a point integral with said shank, the point comprising: a top face; a bottom portion terminating in a heel; a front flank connecting the top face and heel, the flank having a predetermined horizontally formed surface, the vertical contours of all parts of the formed surface having profiles comprising arcs of concentric circles; a cutting edge at the juncture of said top face and front flank, this cutting edge having a shape following the shape of the horizontally formed surface of the flank such that the cutting edge is renewed by shaving a layer off of the top face.

I provide a device for holding flat form tools and the like during a grinding operation. Flat form tools have rectangular shanks which are made to fit standard metal-turning machines used in commercial machine shops. My device is used as an attachment to a standard tool and cutter machine. The device has a shank adapted to fit the collet of a standard tool and cutter machine. The shank has a longitudinal axis of rotation, a free end, and a shoulder. The shoulder is coaxially and integrally formed with the shank opposite the free end of the shank. The shoulder has a free end also. The device has an aperture in the shoulder, the line of sight of the aperture being defined by a lesser chord of a circle concentrically disposed around the longitudinal axis of rotation of the shoulder. The device also has means for positioning a flat form tool within the aperature. Another element of the device is a means for removably securing the tool within the aperature.

In a presently preferred embodiment of my invention, the aperture comprises a channel in the free end of the shoulder, the line of sight of the channel being defined by a lesser chord of a circle concentrically disposed around the longitudinal axis of rotation of the shoulder. A cover closes the longitudinal opening of the channel, the cover being attached to the free end of the shoulder.

Also in a presently preferred embodiment of my invention, the means for positioning a flat form tool within the aperture comprises a projection within the aperture, this projection having a size and configuration keyed to engage a notch in the shank of a flat form tool. The means for removably securing the flat form tool within the aperture comprises: a projection within the aperture, this projection having a size and configuration keyed to engage a notch in the shank of a flat form tool; a plurality of threaded tap holes; a plurality of threaded bolts positioned in said threaded tap holes, said threaded bolts being adapted to urge a flat form tool against the projection in the aperature such that the notch in the shank of the flat form tool is holdingly engaged by the projection in the aperture.

Figure 1:
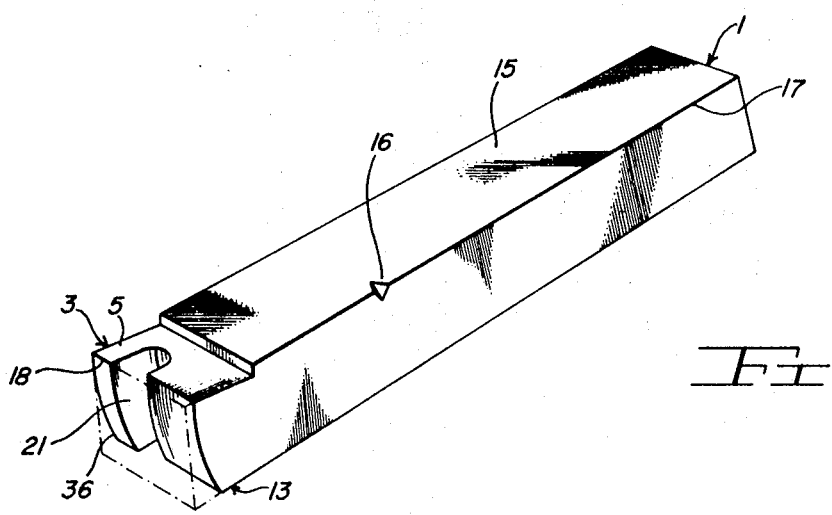
FIG. 1 is a perspective view of an embodiment of the invention in a finished tool showing the configuration of a blank tool in phantom outline.
Figure 3:
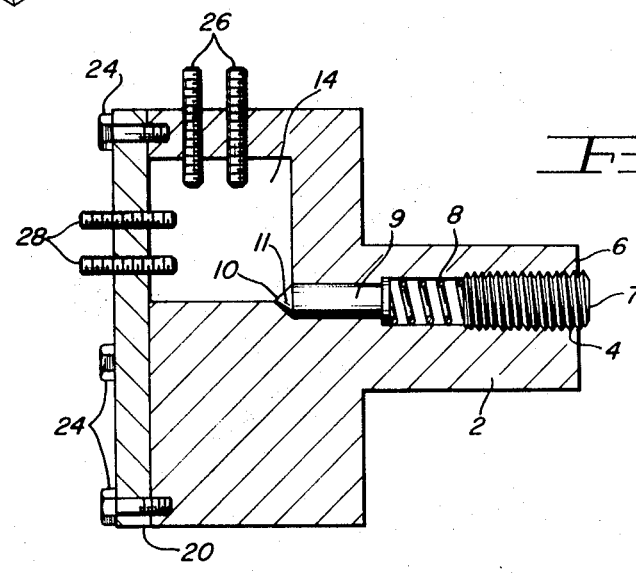
FIG. 3 is a view of the device of FIG. 2 along the line 2—2.
Figure 2:
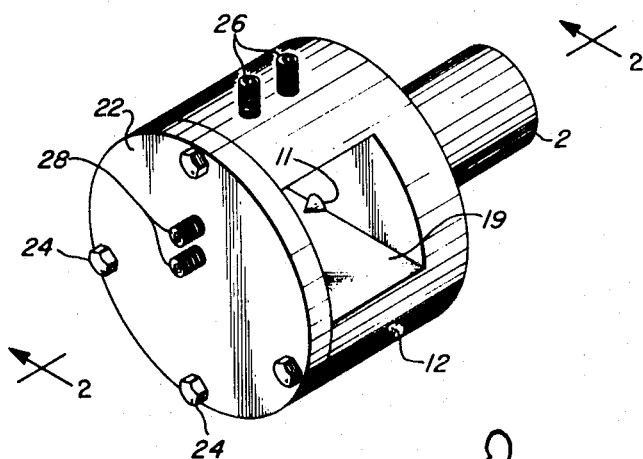
FIG. 2 is a perspective view of the tool holder showing the elements thereof in operative relationship.

Turning now to the drawings, in which a presently preferred embodiment of this invention is depicted, FIG. 1 shows a finished tool of my invention with the shape of the tool blank shown in phantom outline. The flat form tool 1 has a shank 15 and a point 3, a top face 5, a heel 13, a cutting edge 18 and a front flank 21. As seen in FIG. 1 of the drawings, the cutting edge to heel profile 36 is an arc of a circle. The vertical contours of all parts of the surface of the front flank 21 likewise form arcs of a circle and these arcs are the arcs of concentric circles. The configuration of the cutting edge 18 at the juncture of the top face 5 and the front flank 21 follows the shape of the horizontally formed surface of the front flank 21. The heel 13 has the same configuration as the cutting edge 18 because of the fact that the vertical contour of all parts of the formed surface, viewed in profile, form arcs of concentric circles. FIGS. 2 and 3 show the principal elements of the tool-holding device. A number of materials could be used for making this device; however, a strong resistant steel, such as chrome-vanadium or nickel steel, would be an excellent choice of material. An elongate shank 2 is integrally formed with a shoulder 12. The shank 2 has a threaded tap hole 4 drilled from the free end 6 into an aperture 14 in the shoulder 12. A bolt 7 screws into the threaded tap hole 4. A coil spring 8 abutts against the bolt 7 and a pin 9. The spring 8 urges the pin 9 toward the aperture 14 in the shoulder 12. Half of the bevelled edge 10 of the pin 9 projects into the aperture 14. This projection 11 is designed to engage a notch 16 in the shank 15 of a flat form tool 1 as illustrated in FIG. 1. The pin 9 and its projection 11 into the aperture 14 are best illustrated in FIG. 2. The aperture 14 is formed in this embodiment of the invention by forming a channel 19 in the shoulder 12 at the free end of the shoulder 20. A cover 22, which has the same configuration as the perimeter of the shoulder 12, is fastened on by means of bolts 24, thus closing the top of the channel and making an aperture whose line of sight is defined by the lesser chord of the circle circumscribing the perimeter of the shoulder. Bolts 26 and 28 are positioned in top holes in the shoulder 12 and the cover 22, respectively, at right angles to each other. The shank 15 of the tool 1 is positioned in the aperture 14 by registering the notch 16 with the projection 11. When thus positioned, the bolts 26 and 28 are further intruded into the aperture 14, thereby securely pressing the notch 16 of the tool 1 against the projection 11 of the pin 9. In this preferred embodiment, the bevelled edge 10 is ground at a 45-degree angle. The notch 16 is a 45-degree indentation ground in the top right hand side 17 of the tool 1 approximately 1/16 inch deep and 1¾ inches from the end of the tool. These dimensions, of course, are not critical and are to be taken as a guide to the use of this invention and not as a limitation. The purpose of the notch 16 is to locate the tool 1 on the pin 9, and I have been able to hold the position of the tool in the device to less than 0.0001 inch tolerance. This is an extremely useful feature of the device because the tool may be removed as many times as necessary for the purpose of determining the progress of the grinding operation. It can each time be relocated within 0.0001 inch after removal.

Figure 4:
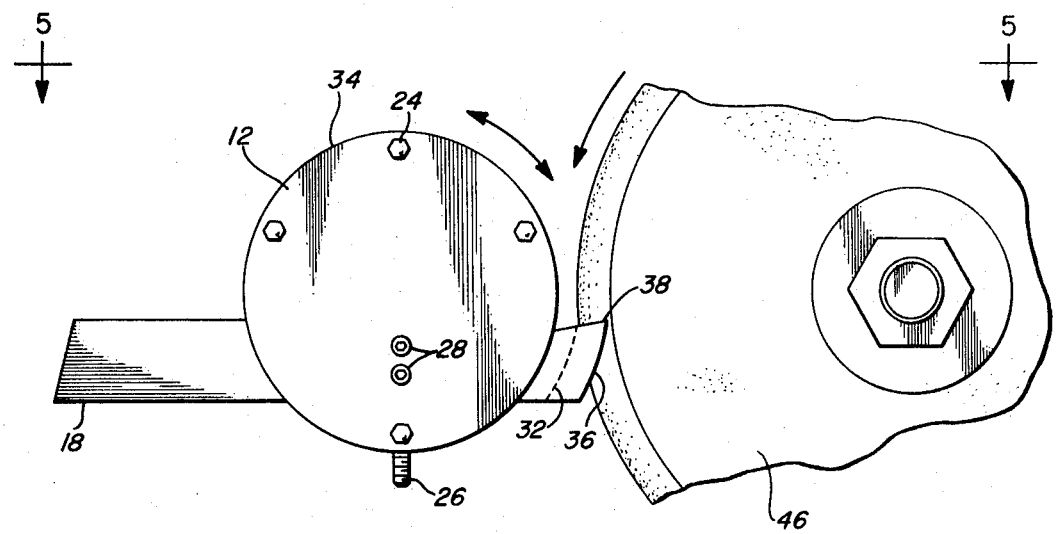
FIG. 4 is a view of the device of FIG. 1 in operation, illustrating its attitude in respect to a grinding wheel.
Figure 5:
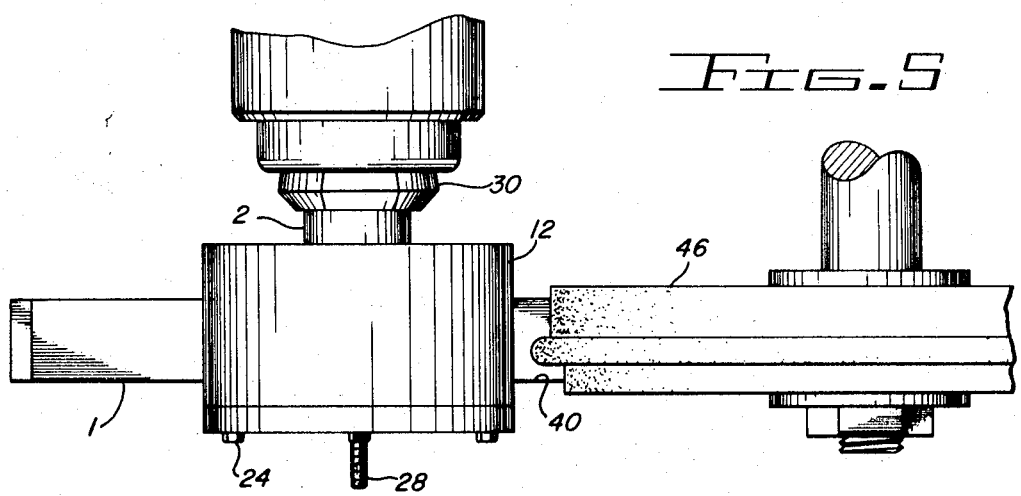
FIG. 5 is the view of FIG. 4 rotated 90 degrees.
Figure 6:
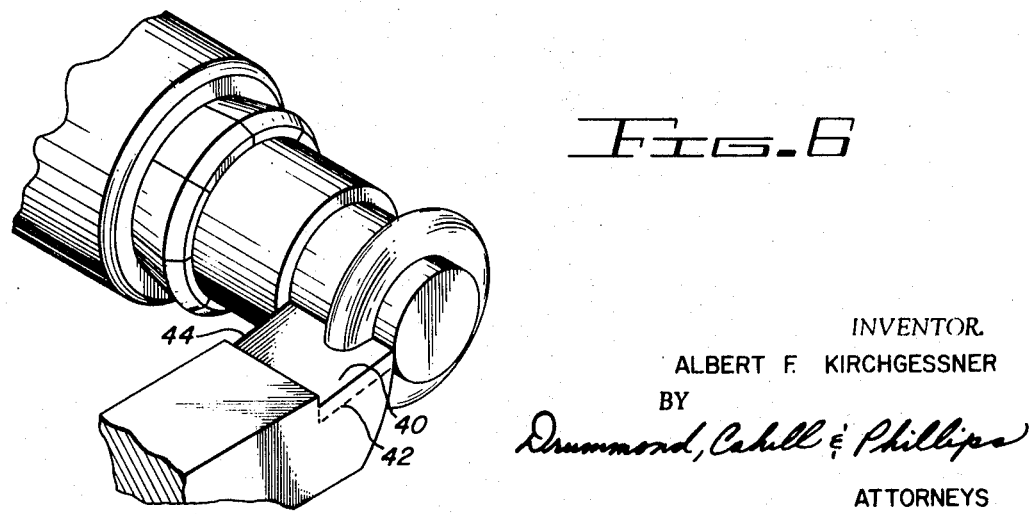
FIG. 6 is a perspective view of the finished tool cutting a piece of work on a turning machine.

To make the tool, using the tool-holding device, the following procedure and method is recommended:

Use a tool blank which has been prepared with a 45 degree notch 16 on the top right hand side 17 of the tool 1 as described above. The 1¾ inches dimension will provide 11 degrees of clearance on the front flank 21 of the tool 1. Depending upon particular objects, this dimension may be adjusted to greater or lesser clearance. Grind the rake angle. At this point the tool 1 is ready for insertion into the aperture 14. It should be inserted so that the notch 16 in the tool 1 registers with the exposed portion of the projection 11 of the pin 9 and to the aperture 14. Position the tool 1 by first tightening bolts 26 lightly until the notch 16 is firmly seated on the projection 11. Then tighten both sets of bolts 26 and 28 so that the tool 1 is held firmly in the aperture 14. Place the shank 2 of the device in the collect 30 of a standard tool and cutter machine (not shown). The grinding operation is then conducted in much the same manner as the grinding operation of a circular form tool. As illustrated in FIG. 4, the shoulder 12 can be rotated in either direction as the convenience and preferences of the operator dictate. The depth of configuration of the cut 32 in the tool 1 is shown in phantom outline. This result is achievable because the aperture 14 in which the tool 1 rests is positioned along a lesser chord of the circle described by the perimeter 34 of the shoulder 12. The configuration of the cut 32 is parallel to the cutting edge to heel profile 36. When the cutting edge 18 becomes dull, the tool is sharpened by shaving the face 40 of the tool 1 along a line 42 parallel to the rake angle 44 as suggested in phantom outline in FIG. 6.

In the case of tools characterized by an unusually large step in the cut, an additonal notch in the tool may be ground to the exact center-to-center measurement of the notches thereby yielding the required depth from the base diameter to the largest diameter. For example, if the distance from the base diameter to the largest diameter is 1.000 inch, the technique is to grind the two notches 16 1.000 inch apart. Thus, exactly the same clearance for the largest diameter and the base diameter is obtained. A side clearance may be achieved by turning the head (not shown) of the grinding wheel.

The advantages of using this method and this device are many fold. To begin with, about half the time is required for grinding the tool. Less heat is developed during the grinding time and the risk of burning the tool is consequently less, and tools ground by this method have a better finish.

Having fully described my invention and the presently preferred embodiment thereof, I claim:

1. A device for holding flat form tools and the like during a grinding operation, for use as an attachment to a standard tool and cutter machine, said device comprising:
 (a) an elongate shank adapted to fit the collet of said standard tool and cutter machine, said shank having
   a longitudinal axis of rotation,
   a free end,
   a shoulder coaxially and integrally formed with said shank opposite said free end of said shank, said shoulder having a free end;
 (b) an aperture in said shoulder, the line of sight of said aperture being defined by a lesser chord of a circle concentrically disposed around the longitudinal axis of rotation of said shoulder;
 (c) means for positioning a flat form tool within said aperture comprising a projection within said aperture, said projection having a size and configuration keyed to engage a notch in the shank of a flat form tool; and
 (d) means for removably securing said tool within said aperture.

2. The invention of claim 1 wherein the means for removably securing said flat form tool within said aperture comprises:
  (a) a projection within said aperture, said projection having a size and configuration keyed to engage a notch in the shank of a flat form tool;
  (b) a plurality of threaded tap holes;
  (c) a plurality of threaded bolts positioned in said threaded tap holes, said threaded bolts being adapted to urge said flat form tool against said projection in said aperture such that said notch in the shank of said flat form tool is holdingly engaged by the projection in said aperture.

References Cited

UNITED STATES PATENTS

| | | | |
|---|---|---|---|
| 1,904,304 | 4/1933 | Flanders | 51—218 UX |
| 2,476,361 | 7/1949 | Elliott | 51—218 X |

HAROLD D. WHITEHEAD, Primary Examiner